Sept. 16, 1969 R. C. BENTON 3,467,900
POSITIONING APPARATUS WITH CONTROLS EMPLOYING
RESISTOR INCREMENTS
Original Filed Dec. 24, 1964 6 Sheets-Sheet 1

Inventor:
Robert C. Benton
By John W. Gaines
Atty.

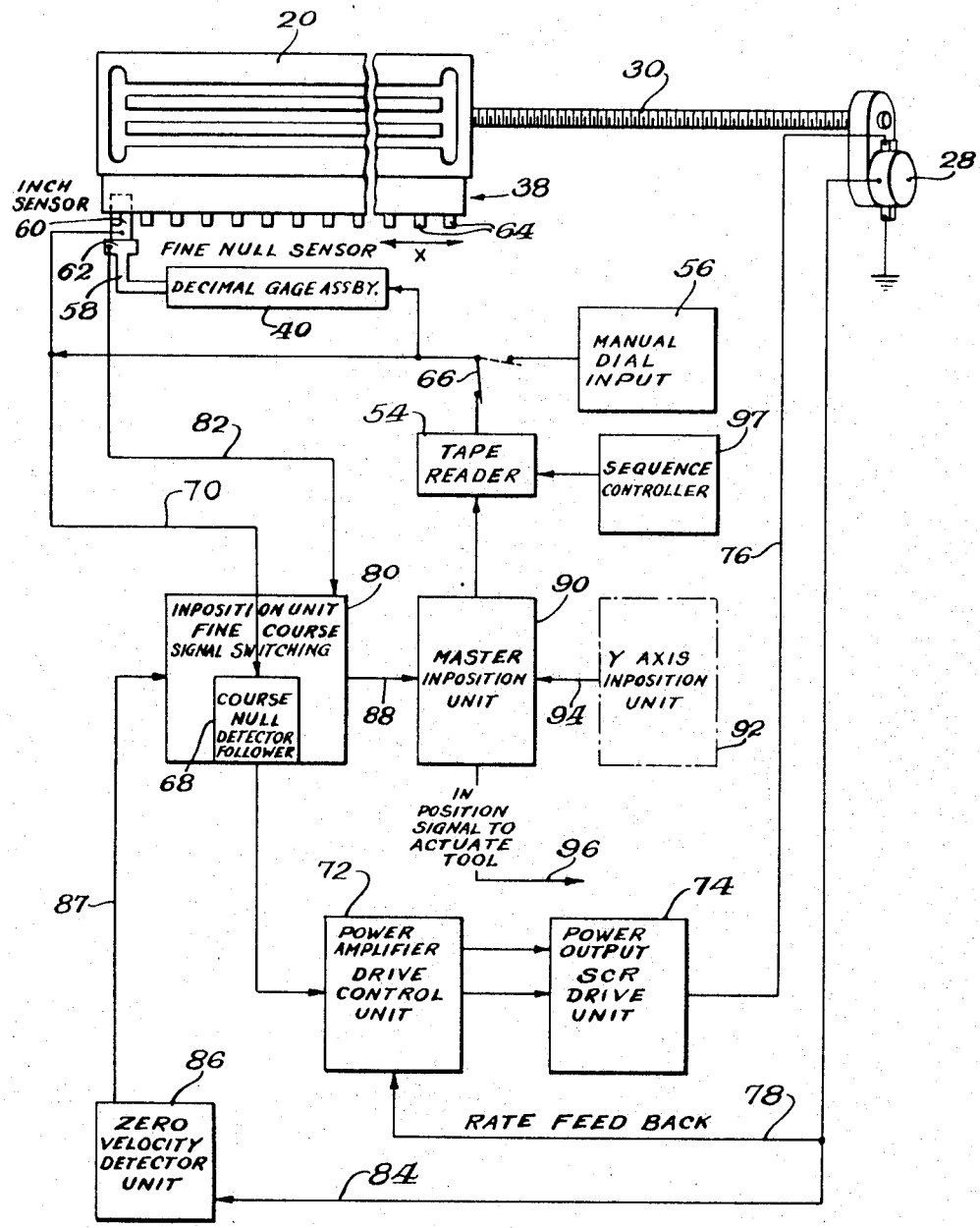

Sept. 16, 1969    R. C. BENTON    3,467,900
POSITIONING APPARATUS WITH CONTROLS EMPLOYING
RESISTOR INCREMENTS
Original Filed Dec. 24, 1964    6 Sheets-Sheet 3
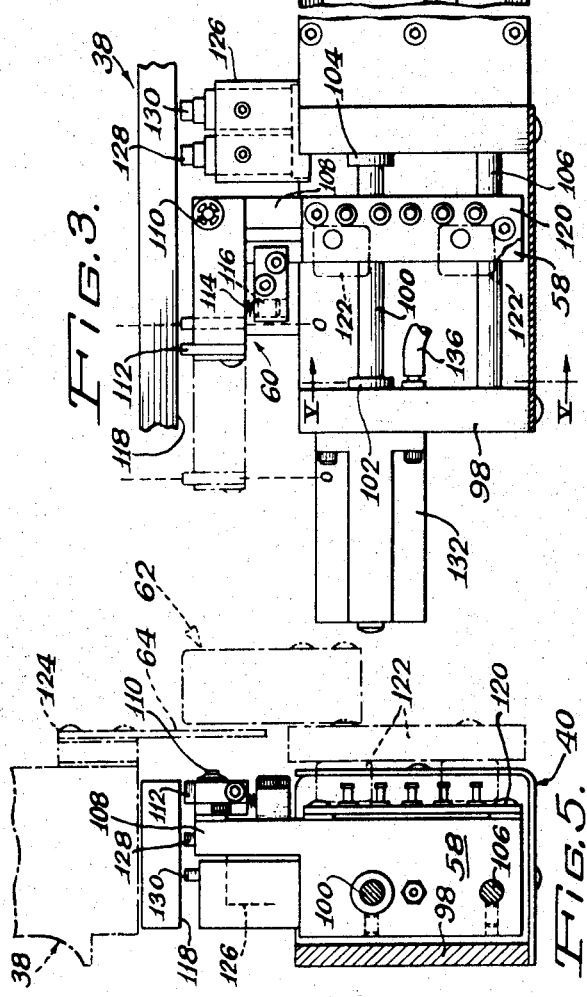
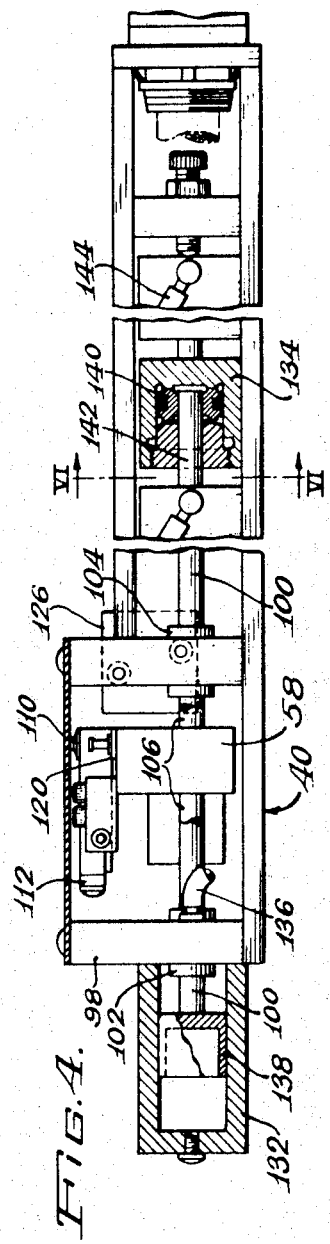
Inventor:
Robert C. Benton
By John W. Gaines
Atty.

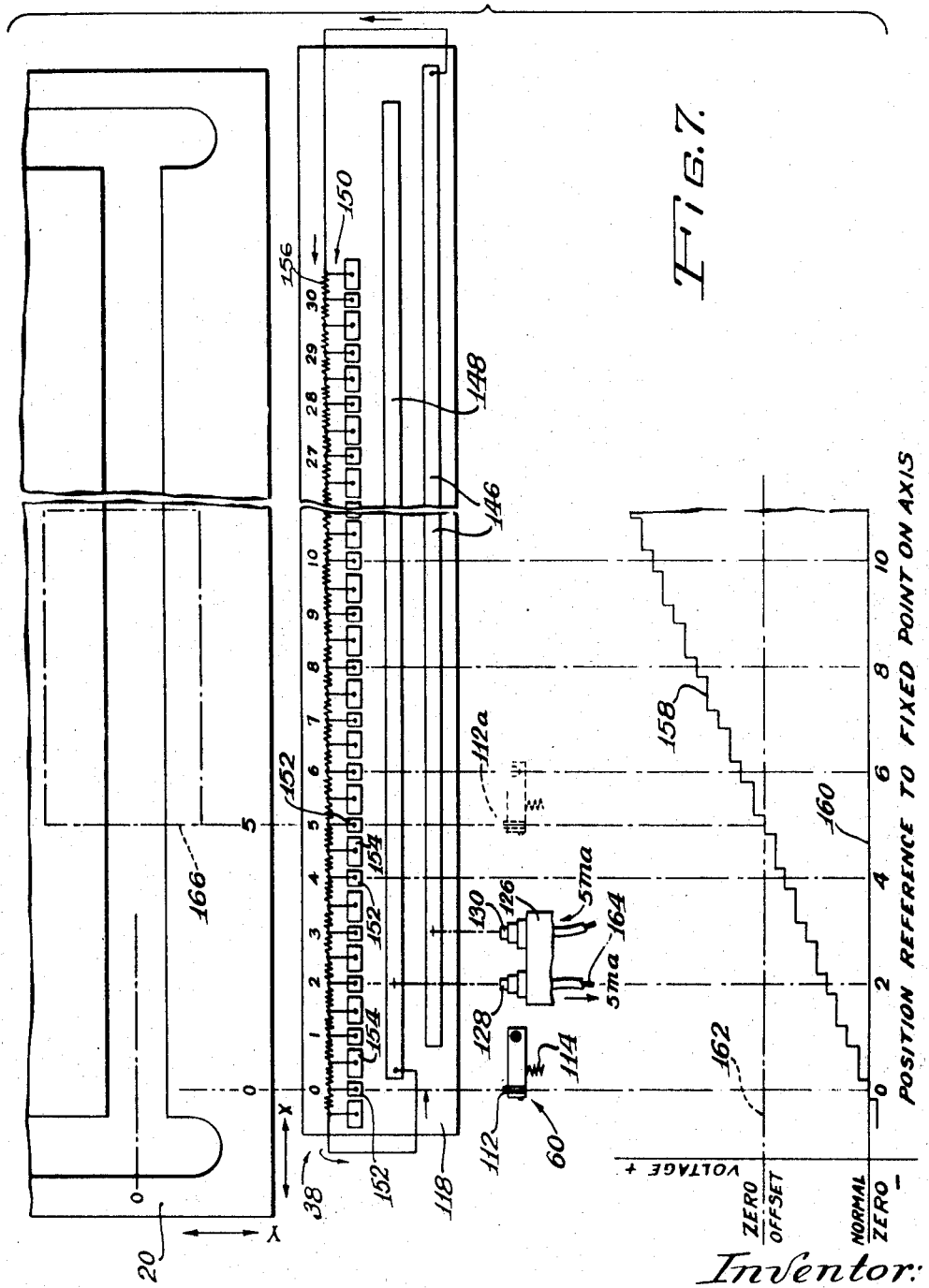

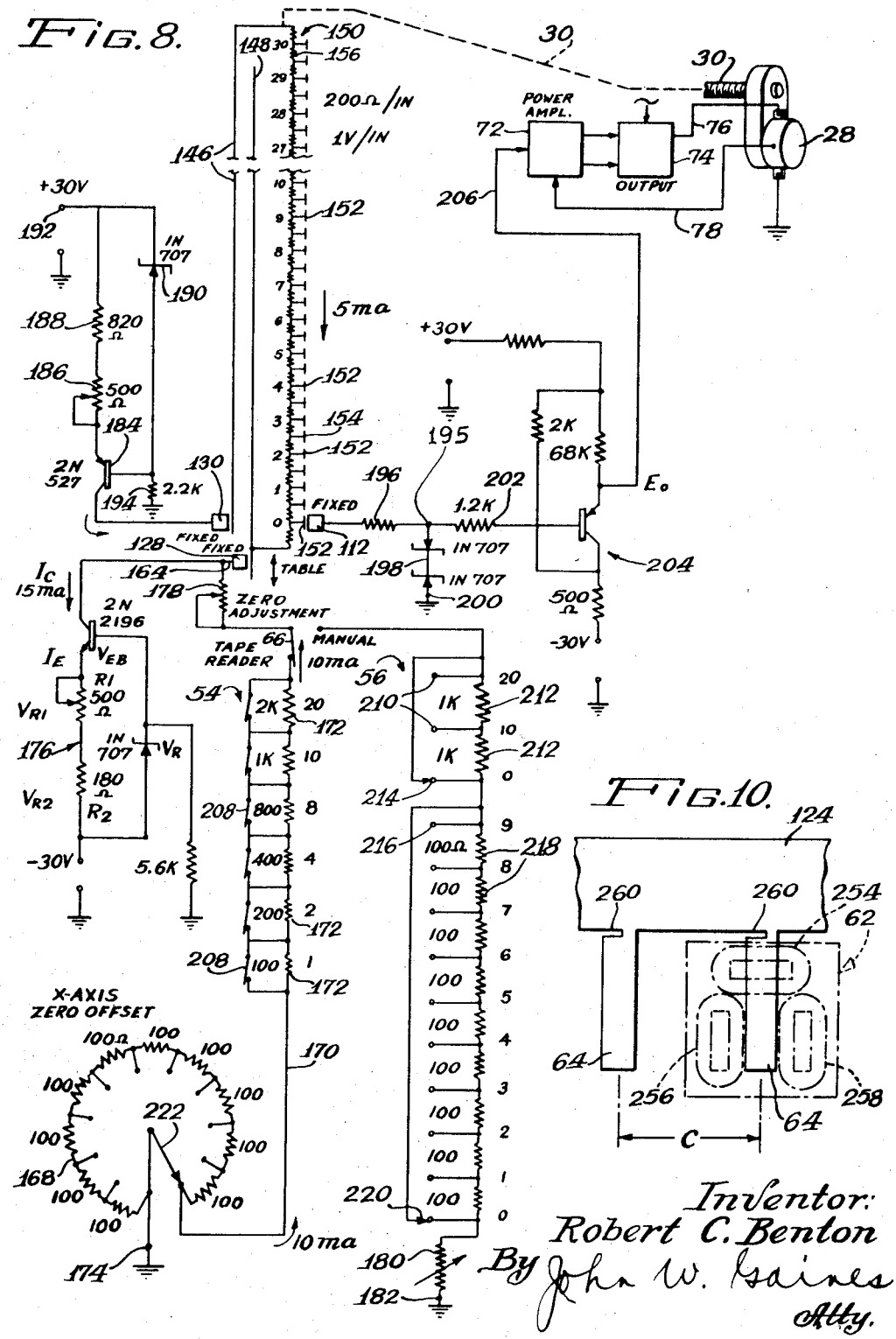
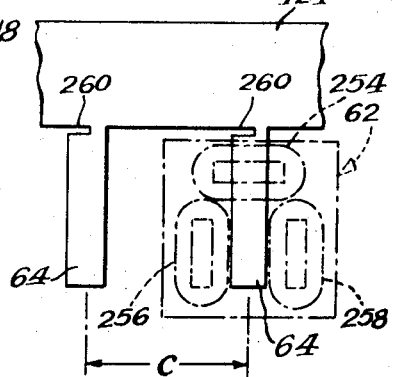

United States Patent Office 3,467,900
Patented Sept. 16, 1969

3,467,900
POSITIONING APPARATUS WITH CONTROLS EMPLOYING RESISTOR INCREMENTS
Robert C. Benton, State College, Pa., assignor to Chemcut Corporation, State College, Pa., a corporation of Pennsylvania
Original application Dec. 24, 1964, Ser. No. 420,872, now Patent No. 3,384,797, dated May 21, 1968. Divided and this application May 15, 1968, Ser. No. 729,314
Int. Cl. H02p 5/46, 7/68, 7/74
U.S. Cl. 318—18                     5 Claims

ABSTRACT OF THE DISCLOSURE

Positioning apparatus which takes a final position corresponding to a pre-recorded coordinate figure taken from a perforated tape input, and which includes a positioned part, with equally spaced apart elements thereon and movable until aligned with stop means; means selecting one of the elements and adjusting the stop means in accordance with the respective integer and decimal portions of the figure; and an apparatus drive controlled by the stop means which interrupts the drive at a point determined by transverse alignment between the selected element and stop means, at which point the positioned part will have taken its final position corresponding to the pre-recorded figure.

---

The present application is a division of the copending parent Benton case Ser. No. 420,872, filed Dec. 24, 1964, now U.S. Patent No. 3,384,797, which latter covers aspects of the specific control elements effecting large increment positioning in a serial method of positioning a workpiece or the like. This division covers aspects of the controls overall, effecting precise coordination of the large and the small increment positioning.

This invention relates to positioning apparatus. The apparatus controls the position of a first member, such as a tool or the table of a machine tool, relative to a second member, such as the base of the machine tool, and the action is automatic, rapid, and accurate.

The controlling means of my invention are applicable generally to equipment and operations including programed drilling, milling, boring, riveting, spot welding, welding positioning, assembly, and inspection. In more specific examples of applications, these controlling means serve as the controls for automatic point to point positioning and straight line milling on machine tools, and serve as production tool controls.

An object of my invention is to provide a machine tool with means, such as a potentiometer, for producing a preset DC voltage representing the actual position of the work table, means which substracts from that voltage a second voltage representing a desired table position and which derives from the two a difference or error voltage referenced absolutely to a zero or ground potential, and operating means using the error voltage to control a motor drive which adjusts the position of the work table until the work table occupies the desired position. The second voltage is the voltage created by flowing current through a number of resistor increments, the increments being activated through a selection process. The resistor increments have an input which provides a switching function to select the increments when it receives the numerical code output of an output means. A cooperating output means such as a binary tape reader provides output switching signals corresponding to the binary code to selectively activate the resistor increments.

Table positioning is achieved, according to an electrical null detector practice used in the past and employing the four legs of a Wheatstone bridge or a bridge type positioning circuit, by a comparison between an adjustable voltage taken on one side of the circuit and a floating voltage taken at the other side of the circuit, and by a balance attained when the two potentials are brought to the same level so that a null or zero current transfer point is reached. Because the parts so balanced are essentially a duplication of one another, it is therefore the practice in past bridge circuit systems to provide two full sets of precision resistors and two full sets of operating switches for the resistors, adding to the expense but nevertheless maintaining a match in the characteristics of the circuit. Current is constantly circulating in the system for its action, and it therefore is the further practice to provide separate and isolated power supplies for the legs, and also isolated amplifiers in instances, adding to the expense and complications but at the same time keeping the voltages more uniform and current flows essentially constant for accuracy sake, particularly while the bridge is unbalanced.

Also, the bridge output is normally handled by electromechanical switching because of convenience, and it is therefore the practice to rely upon electromagnetic relays such as perhaps polarized relays in the output, adding to the straightforwardness of operation but nevertheless introducing the difficulty of relay unreliability, being vulnerable to stray magnetic fields, and being subject to contact bounce which is characteristic of mechanical contacts. A further difficulty is that once the Wheatstone bridge or bridge type circuit is properly calibrated for a positioning table, any subsequent internal adjustment will throw the bridge unwantedly into unbalance so as to give a false reading; hence, there is no practical means to establishing one or several inches of axis zero offset as desired, e.g., a five inch X-axis zero offset in the table position. The table is thus lacking in the property of versatility or adaptability for conveniently handling a range of sizes of workpieces.

My invention materially reduces the foregoing difficulties, providing programmed positioning controls which are relatively insensitive to their environment and having a highly reliable switching action and flexibility as will now be explained. Also features, objects, and advantages will either be specifically pointed out or become apparent when, for a better understanding of the invention, reference is made to the following written description, taken in conjunction with the accompanying drawings which show a preferred embodiment thereof, and in which:

FIGURE 2 is a block diagram of the controls for positioning the drill table along orthogonal axes;

FIGURES 3 and 4 are front elevational and bottom plan views, being shown to enlarged scale and showing one decimal gage assembly appearing in FIGURES 1 and 2;

FIGURES 5 and 6 are transverse elevational views taken along the respective section lines V—V of FIGURE 3 and VI—VI of FIGURE 4;

Figure 9:
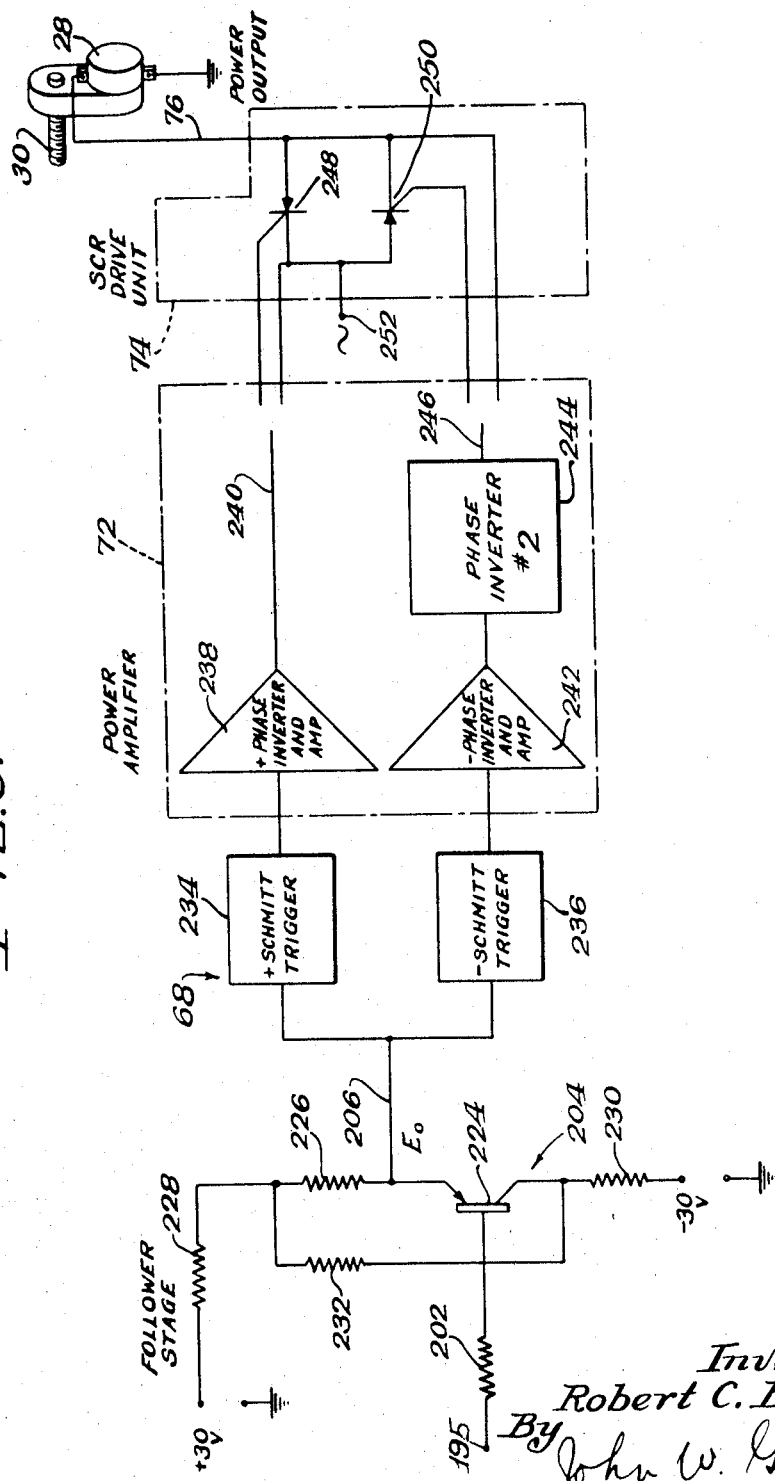

FIGURE 7 at the center is a fragmentary, front elevational view generally corresponding to FIGURE 3, having superimposed thereabove the drill table rotated out of plane so as to apppear in top plan, and a printed circuit board rotated out of plane so that it appears in bottom plan view, and having superimposed therebelow a voltage curve to show voltage steps on the printed circuit board;

FIGURE 8 is a diagram of an automatic control circuit including the printed circuit board;

FIGURE 9 is a fragmentary view, to enlarged scale, of a portion (final output) of the control circuit of FIGURE 8; and FIGURE 10 is a front elevational view of a decimal gage assembly, FIGURE 3 being the same view of the assembly but with the showing of FIGURE 10 removed.

Figure 1:
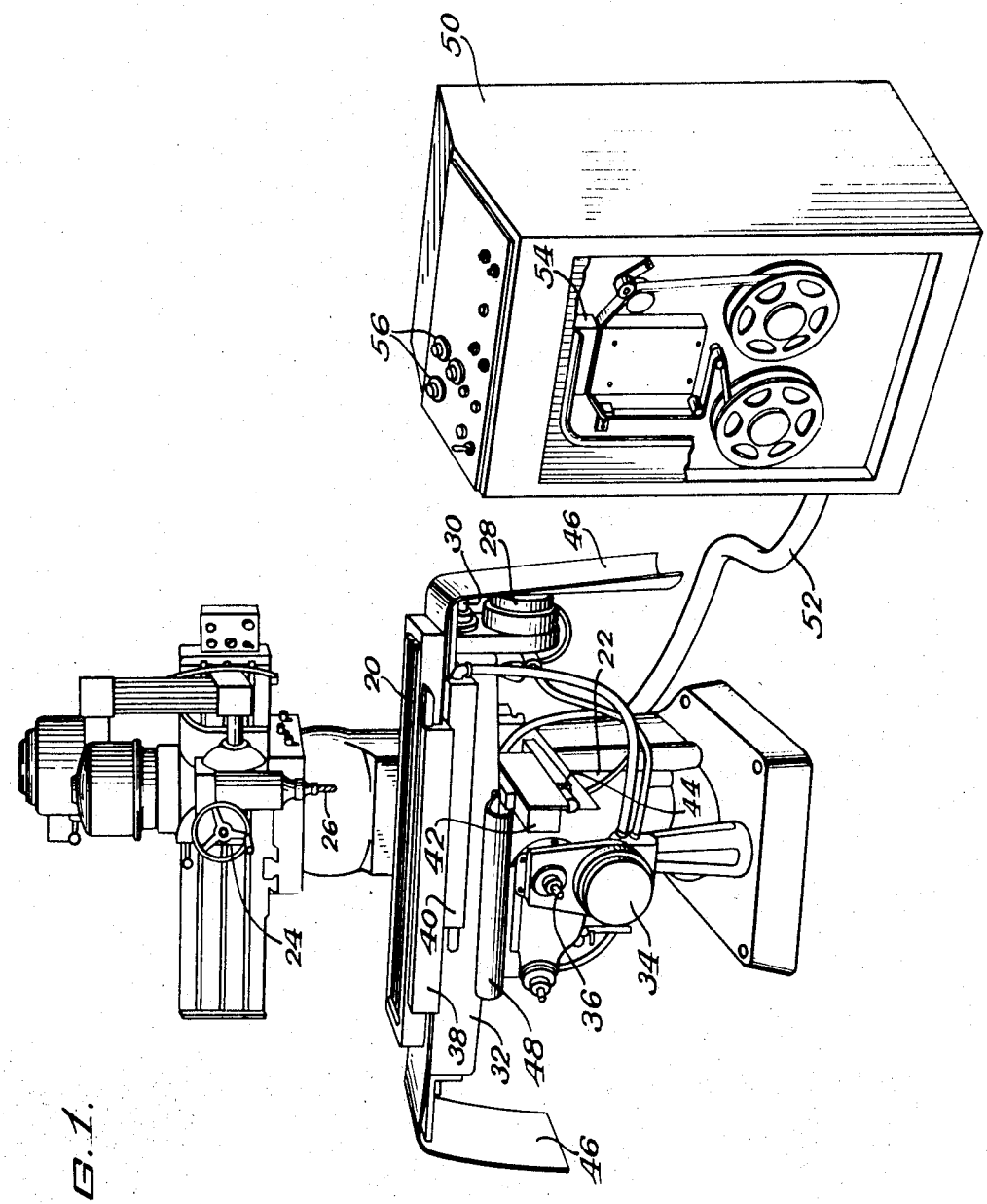
FIGURE 1 is a perspective view of an automatic machine tool embodying the present invention and shown with a programmer.

More particularly in FIGURE 1 of the drawings, a table 20 is mounted for universal rectilinear movement on coordinate axes relative to the base of a machine, e.g., an automatic drill. A tool head 24 carries a vertically fed drill bit 26 which can be adjusted in a horizontal plane by appropriately setting the head 24. The drill bit 26 drills holes in a workpiece, not shown, such as a printed circuit board, which is moved by point to point positioning upon, and carried by, the drill table 20.

An X axis motor 28 operates through gearing and a lead screw 30 to move the table 20 with respect to a saddle 32 which supports the table. A Y axis motor 34 operates through gearing and a lead screw 36 to move the saddle 32 with respect to the base 22. Measurement of the final position taken in the X direction is controlled by a shroud or rail structure 38 carried by the table 20 and cooperating with appropriate reference heads and a decimal gage assembly 40 carried by the saddle 32. The measurement of the final position taken in the Y direction is controlled by a rail structure 42 carried by the saddle and cooperating with reference heads and a supporting decimal gage assembly 44 carried by the base 22.

The saddle 32 is guidingly supported on Y ways carried by the base 22, and guidingly supports the table 20 on X ways carried by the saddle 32. A pair of flexible rubber mats 46 connected one at each end of the table 20 forms an apron to collect, and to convey to the side, chips resulting from drilling. Two aprons, one shown at 48, are connected to opposite sides of the saddle 32 to form another apron for the drilling chips.

A console type programmer 50 has a control wiring and air tube conduit 52 connected to the drilling machine and can be selectively operated to run the drill automatically from sequential blocks of coded perforations read by a tape reader 54, or manually by a manual dial input 56 having settable dial markings which read directly in cardinal and decimal coordinates.

In FIGURE 2, the reference heads cooperate as large and small increment, control and stop means in controlling the lead screw 30 to set the table 20 by a serial method of positioning. The table 20 is initially caused to move almost all of the way into final position at a high or slow speed, and then is decelerated and moved into final position at a slower average speed which reduces as the distance from final position is reduced. Two reference heads are employed, having a common X axis sensor arm 58 supporting them and positioned by the decimal gage assembly 40. The first reference head comprises an inch sensor 60 for large increment positioning and the second reference head comprises a decimal or small increment sensor 62 for the small increment positioning. The small increment sensor 62 cooperates with locator fingers 64 within the shroud or rail structure 38 carried by the table.

A switch 66 allows the tape reader 54 or the manual dial input 56 to be selectively connected to the gage assembly 40 and to the inch sensor 60. A course null detector or follower 68, having a connection 70 leading thereto from the inch sensor 60, has a follower function whereby when the table 20 is sensed to be out of the desired position, the null detector 68 causes a power amplifier 72 to operate the power output 74, the output having a connection 76 to the X axis motor 28. When the table 20 reaches its large increment position, the course null detector 68 detects a null from the inch sensor and interrupts the large increment drive so that a take over circuit can operate the amplifier. A first closed loop 78 from the motor 28 is a negative feed back loop to the power amplifier 72, and affords more power when the motor is loaded so that the table slews at approximately the same speed whether loaded or unloaded.

The take over circuit just referred to is included in an in position unit 80 having a connection thereto at 82 leading from the decimal or small increment sensor 62. The take over circuit in unit 80 operates after the course null detector has operated, and enables the fine course signal switching to control the amplifier 72, the power output 74, and the X axis motor 28 to accomplish and terminate the fine adjustment of the table into final position.

A second closed loop 84 from the motor 28 provides a motor speed signal to a zero velocity detector unit 86. The unit 86 has a connection 87 whereby it controls the in position unit 80. The unit 86 causes the in position unit 80 to cease operating the power amplifier 72 and to communicate through a connection 88 a final signal to a master in position unit 90, namely, a signal that the table 20 has reached its final position on the X axis. At or about this time, a Y axis in position unit 92, which duplicates all components of the X axis controls and includes as operating elements the rail structure 42 and the decimal gage assembly 44 of FIGURE 1, communicates through a connection 94 a signal to the master in position unit 90 that the table is in final position on the Y axis.

If a three axis machine tool is being employed, then a Z axis in position unit, not shown, can be provided to signal the master in position unit 90 that the table is in final position along the Z axis.

When all such signals are received by the master in position unit 90, it communicates through a connection 96 a signal to actuate the drilling tool, not shown. The drilling tool completes the cycle. The cycle is then repeated, all under control of a sequence controller partially shown at 97 and located in the programmer.

In FIGURES 3, 4, 5, and 6, the decimal gage 40 has a long horizontally disposed frame 98 in which the sensor arm 58 is slideably carried. The arm 58 is fast to a reciprocatory upper shaft 100 journalled in precision linear ball bearings 102 and 104. A lower shaft 106 fixed in the frame 98 supports the arm 58 for sliding movement relative thereto. An upstanding extension portion 108 of the arm 58 carries a horizontal pivot 110 which pivotally supports an insulator arm carrying a pick off brush 112. A compression spring 114, which rests on a seat 116 fast to the portion 108, engages the insulator arm to bias the brush 112 into sliding electrical contact with a printed circuit 118 carried by the table connected rail structure 38.

The front of the sensor arm 58 supports a binding post strip 120 of insulating material, and a set of blocks 122 carried in frontwardly offset relation to the strip 120 supports the decimal or small increment sensor 62 (FIGURE 5). The cooperating locator fingers 64 form part of a panel 124 included in the rail structure 38 carried by the table, and move in a path closely spaced apart to and sensed by the sensor 62.

A brush housing 126 having a fixed location on the frame 98 carries two contact brushes 128 and 130 which are spring biased upwardly so as to form sliding electrical connections at spaced apart points on the printed circuit 118.

The reciprocatory upper shaft 100 is operated by a return air cylinder 132 and a series of tandem connected binary difference cylinders 134, the purpose being to establish a one inch range of adjustment for the reference heads carried by the sensor arm 58, namely, the inch sensor 60 and the small increment sensor 62. The programmer, not shown, introduces air into the outer end of the return cylinder 132 through a hose 136 and certain interconnecting passages, not shown, so as to move a cup shaped return piston 138 to the right as viewed in FIGURES 3 and 4. The air can be air at low pressure if desired, in which case the air is a biasing means and the pressure can be continual.

There are preferably twelve of the binary cylinders 134, each containing a short precision stroke piston 140 which forces a piston rod 142 against the next cylinder and which in general does not duplicate the stroke of any other binary cylinder. These cylinders 134 are numerical conversion systems, air operated, single acting cylinders which are selectively actuated in appropriate sum combinations to produce movement to any point, to the nearest one one-thousandth inch, for example, within a decimal range from 0.000 to 0.999 inch.

Details of the internal construction and a binary to decimal conversion principle involved in the cylinders 134 are set out in U.S. Patents No. 3,138,073 and No. 3,154,858, the descriptions whereof being incorporated here by reference. Briefly, high pressure air is introduced through individual hoses 144 into selected cylinders 134 from the tape reader, overcoming the low biasing pressure against the piston in the return cylinder 132 and causing the two reference heads conjointly to take a small increment presetting. After the master in position unit indicates the table motion is complete, the tape reader vents the cylinders 134 preliminary to advancing to the next reading, and the return cylinder 132 restores the cylinders 134 to a zero setting.

The Y axis decimal gage assembly 44 is not illustrated in detail. It is identical to the X axis decimal gage assembly 40 except for minor variations including the shape of the sensor arm 58, and the location of the pick off brush 112.

In the unfolded type, schematic showing of superimposed views in FIGURE 7, the printed circuit 118 of the table connected rail structure 38 has first, second, and third parallel strips or paths of conductive metal applied on a common insulating panel. The first metal path is an uninterrupted strip 146 on which the brush 130 rides in continual contact in all positions of the table 20. The second path is an uninterrupted strip 148 on which the brush 128 continuously rides.

The pick off brush 112 is in contact with and forms a reference contactor element to the third path, which is part of a potentiometer 150. More particularly, the third path comprises printed circuit, spaced commutator like segments forming the intermediate terminals 152 and 154 of the potentiometer 150, of which the strips 146 and 148 form the respective first and second end terminals. The intermediate relatively short terminals 152 are numbered 0 through 30, and the terminals 152 and 154 have therebetween precision resistors 156 of equal value. In practice, the resistors 156 do not consist of printed circuit resistors but are separate components soldered to the printed circuit 118.

Alternate ones of the segments consist of the short segments 152 which carry the numbers, actually representing whole inches. Each remaining one of the segments 154 is long and is in effect a split commutator segment midway within each inch so that a clear transition point is afforded in the readings as between being at a precise inch point and being slightly away from a precise inch point.

Constant current flows in the potentiometer 150 in the direction of the arrows shown in FIGURE 7. The square stepped curve 158 represents the voltage gradient therealong. The regular abscissa axis 160 represents the normal zero level of voltage of the potentiometer 150 referenced to ground, and the terminal 152-0 thereof is at ground voltage and corresponds to the absolute zero measurement point of the X axis indicated at 0 on the table 20. However, a series of hand selected resistor increments, not shown, is connected to the lead 164 of brush 128, establishing a zero offset axis 162 by substracting, from the voltage of the potentiometer 150, a second voltage resulting from the resistor increments, not shown. In that way a long table, for example the table 20 having a thirty inch total travel in the direction of the X axis, can be supplied with coded perforation input suitable only for a small workpiece, and the work can be done on that small workpiece at a convenient, more or less central location on the table 20 rather than at one end.

In the illustrative example of a small printed circuit board 166 forming the workpiece on table 20, an X axis zero offset of five inches can be effectively superimposed upon all input coded perforation readings by the mere shift of the abscissa axis into the zero offset position 162, through the simple voltage subtraction process. In this example, the resistors 156 have a value of 100 ohms apiece, so that a constant current of five milliamperes maintains a uniform voltage drop of one volt per linear inch along the potentiometer 150. That is to say, the potential difference between any short segment 152 and either adjacent long segment 154 is 0.5 volt.

The subtraction voltage which is to be created by resistor increments, not shown, is of the desired value five volts, being the amount necessary to shift the zero voltage point to the required terminal 152-5 appearing in FIGURE 7. Therefore the zero point is appropriately shifted and the the terminal 152-5 is caused to reach transverse alignment with the pick off brush, the pick off brush at that time occupying the broken line position relative to the table as shown by the broken lines 112a.

In FIGURE 8, the resistor increments referred to in the discussion of FIGURE 7 preceding are in a rotary rheostat 168. The rheostat 168 forms an impedance in series aiding relationship, in a branch circuit 170, with a second impedance composed of dissimilar series connected resistors 172 operated by the tape reader 54. The resistors 172 are in whole integer multiples of 100 ohms, and are of the differing sizes indicated for appropriate binary to decimal conversion. The rheostate 168 is connected by a first terminal 174 to a current source which can be a convenient zero ground connection.

The lead 164 from the potentiometer end terminal brush 128 is connected in common by a three way junction to a negative source 176 included in a constant current, quad power supply, and to a zero adjustment rheostat 178. The double throw selector switch 66 is connected to the rheostat 178 for selectively including in circuit therewith, first, the tape reader impedance and the impedance of the rheostat 168 in the branch circuit 170 or, second, the manual dial input generally indicated at 56. Another manual rheostat 180, which can be similar to the rheostat 168, connects the manual dial input 56 to a zero ground connected terminal 182.

A positive source, also included in the quad power supply, comprises a p-n-p transistor 184 which has emitter resistors 186 and 188 connecting the transistor with a Zener diode 190, the diode being coupled between the transistor base and emitter. The resistor 188 and the anode of the diode 190 are supplied at 192 with a DC potential of 30 volts. The transistor base and the diode cathode are connected through a resistor 194 to ground, and the collector of the transistor is connected to the brush 130 on the first terminal 146 of the potentiometer 150. The terminal at the three way junction among the brush lead 164, the negative source 176, and the zero adjustment rheostat 178 is effectively the second end terminal of the circuit branch 170 and of the reader resistor increments 172 therein.

A three way junction terminal 194 is connected through a resistor 196 to pick off brush 112, is connected through back to back Zener diodes 198 to ground at 200, and is connected through a resistor 202 to an emitter follower transistor circuit 204. The output voltage $E_0$ from the emitter follower circuit 204 is applied through a connection 206 to the null sensor 68, not shown, and the power amplifier 72.

Within the constant current quad power supply referred to, the components and connections of the negative source 176 are similar to the ones already described in connection with the positive source. Both sources operate as constant current regulators the same as the regulated power supplies disclosed in "Semiconductor Devices and Applications," a book by Greiner, McGraw–Hill, New York, 1961. Briefly, the emitter follows the voltage of the base of the n-p-n transistor 2N2196 to supply constant current to the load. The Zener diode 1N707 is a reference voltage diode which interacts with the transistor to establish constant potential on the base of the transisor. The transistor interacts by its amplification to protect the Zener reference diode and also the transistor helps to maintain the current relatively constant through the diode.

By reference to the voltage drops and resistance notations in the negative source 176 of FIGURE 8, it will be seen in connection with Equations 1 and 2 to follow, that the collector current $I_C$ through the transistor will be maintained substantially constant irrespective of magnitude of the load. Typical values, respectively, are that the emitter to base voltage $V_{EB}$ is a constant 0.2 volt, that the reference diode voltage $V_R$ is a constant five or six volts, and that the voltage drop in total across the series connected transistor, resistance R1, and resistance R2 is at all times in excess of seven volts in order for the assumed relations to hold and the constant current characteristics to be maintained. Low saturation resistance, high gain type transistors are preferable and, inherently with their use for the present regulator function, $I_C$ will approximately equal the emitter current $I_E$, and $V_{EB}$ will remain a small value which is relatively constant with temperature.

(1)
$$I_E = \frac{V_{R1}+V_{R2}}{R1+R2} = \frac{V_R - V_{EB}}{R1+R2}$$

(2)
$$I_C \text{ approx. equals } I_E = \frac{V_R - V_{EB}}{R1+R2} = \text{constant}$$

In view of the foregoing and by analogy thereto, the description can be omitted of the constant current operation of the positive source in the quad power supply, for the sake of brevity.

Also in view of the foregoing, the other positive and other negative source in the quad power supply provided for Y axis control are not shown or described, for the sake of brevity.

In preparing the circuit of FIGURE 8 for operation, with the components already having the settings and current flow as illustrated, the rheostat 178 is adjusted whereby the potentiometer current, of the magnitude and in the direction indicated, causes zero or ground potential to fall at the terminal 152–0. The table, not shown, and the potentiometer 150 thus have no X axis zero offset, and an output voltage $E_0$ of zero volts is communicated by the follower circuit 204 so as to prevent the motor 28 from driving the lead screw 30 in either direction. If, at this time, the tape reader 54 operates so as to open a pair of shorting switches 208–1 and 208–8 thus introducing 900 ohms resistance in the 10 ma. branch circuit 170, a nine volt drop is created across the resistor increments within the tape reader 54. This voltage is in series opposing relation to the voltage level of the potentiometer 150, and subtracts therefrom, so as to shift the zero point to the intermediate terminal 152–9 which is thus referenced directly at ground potential. A negative potential of nine volts immediately appears at the reference contactor element 112, and the negative output voltage $E_0$ from the follower circuit is applied to the line 206 leading to the motor drive. The lead screw 30 is rotated, moving the table and the potentiometer 150 to the point at which the intermediate terminal 152–9 contacts the reference contactor element 112, thus affording a null signal to be sensed from the line 206 so that the power amplifier 72 rebalances and stops the drive.

The manual dial input 56 includes first and second rotary rheostats having resistor increments as marked. The first rheostat has terminals 210 provided therebetween with large, equal sized resistors 212 and engageable by a sliding contactor 214. The second rheostat has terminals 216 provided with small, equal sized resistors 218 therebetween and engaged by a sliding contactor 220. If the selector switch 66 is thrown into the manual position indicated by the broken lines in FIGURE 2, the table can be moved manually into all positions that can be attained by the automatic operation just described. The operator moves the second rheostat contactor 220 until, for example, it makes contact with the terminal 216–9 and the table will move to the nine inch mark. If, at that time, the contactor 214 of the first rheostat is moved into contact with the terminal 210–10, a total of nineteen volts will be subtracted from the potentiometer 150 and the X axis motor 28 will move the table until the drive is interrupted precisely where the nineteen inch mark is in contact with the reference contactor element 112.

The nineteen inch mark can be reached in another way, now described to illustrate operation of the X axis zero offset rheostat 168. The slider 222 in the rheostat 168 is simply moved counterclockwise to, as an example, its extreme position inserting 1000 ohms in the branch circuit 170. Then, under a setting of the switch 66 for tape reader operation, if coded perforations read into the reader 54 cause the switches 208–1 and 208–8 to open as before, the table will move the workpiece to a point corresponding not the nine inch X axis reading but to a nineteen inch reading measured from the absolute zero reference point. A larger rheostat is employed to afford more available X axis zero offset in a table having a longer total travel.

In FIGURE 9, the follower circuit 204 applies an equivalent voltage from the three way juncture 194 to the line 206 by an emitter follower principal. A p-n-p transistor 224 has the emitter connected through two series resistors 226 and 228 to a positive current source and has the collector connected through a series resistor 230 to a negative potential source. A shunting resistor 232 is connected to the transistor side of the resistor 228 and to the transistor side of the resistor 230. The output voltage $E_0$ in the line 206 is either negative or positive, depending upon whether the reference contactor element, not shown, is on one side or the other side of the particular intermediate terminal 152 (not shown) which is currently at zero potential in the potentiometer 150. A positive output voltage $E_0$ affects a Schmitt trigger 234 in the null sensor circuit but does not influence a parallel connected negative Schmitt trigger 236 in the circuit. The output of the Schmitt trigger 234 is applied to a phase inverter and amplifier 238, from which the output 240 is taken.

A negative output voltage $E_0$ in the line 206 has no influence on the Schmitt trigger 234 but causes a triggering action in the negative Schmitt trigger 236. The output of negative Schmitt trigger 236 is applied to a negative phase inverter and amplifier 242. The output of the negative phase inverter and amplifier 242 is applied to a No. 2 phase inverter 244 which provides an output 246.

Each Schmitt trigger is, in effect, a DC bistable multivibrator, operating in the manner detailed in "Transistor Applications," a book by Shea, Wiley and Sons, New York, 1964, and also detailed in "Semiconductor Devices and Applications," a book by Greiner, McGraw-Hill, New York, 1961. The Schmitt trigger has a certain threshold level of input voltage and a reset level, and is characterized by changing state suddenly when the input voltage increases in magnitude to the threshold level, then shifting back when the input voltage decreases in magnitude to the reset level.

As a numerical example, any impressed potential of plus 0.2 volt or more in the line 206 causes an output potential of 8.0 volts from the Schmitt trigger 234 and causes an output potential of minus 12.0 volts in the output 240; the output applied by the amplifier 242 is minus 12.0 volts, and the output of both the negative Schmitt trigger 236 and the output 264 is zero volts. When the potential impressed in line 206 is between plus 0.2 volt and minus 0.2 volt, the Schmitt triggers 234 and 236 provide zero potential output, as do all other components except the negative phase inverter and amplifier 242 from which the output is minus 12.0 volts. When the potential in line 206 is at, or more negative than, minus 0.2 volt, all voltages are zero except the output potential from the negative Schmitt trigger 236 is mius 8.0 volts and the output 246 has a potential of minus 12.0 volts.

The action of the stage 204 in its accurate emitter-follower function, the action of the Schmitt triggers in their change of state function, and the action of the units 238, 242, and 244 in their amplification and phase inverter function cooperate to apply to the SCR drive unit an output of the necessary algebraic sign and necessary magnitude, all in a manner which effectively avoids electrically loading the table connected potentiometer.

The SCR drive unit 74 is coupled between the outputs 240, 246 of the power amplifier 72 and the motor 28, so as to stop, start, or reverse, the motor 28 with balanced or unbalanced current pulses as necessary. Within the SCR drive unit, a semiconductor controlled rectifier 248 is poled with the cathode connected to a sixty-cycle power source 252. The power source 252 is connected also to the anode of a reversely poled, semiconductor controlled rectifier 250. The common connection 76 going to the motor 28 and both of the gate leads from the rectifiers 248 and 250 are appropriately coupled to the power amplifier 72 by connections, not shown.

The motor 28 is a permanent magnet, lower inertia printed circuit DC motor which is caused to have slight dither in the stopped position because the connection 76 thereto is in the power output of the oppositely poled rectifiers 248 and 250. If either rectifier in its half of the cycle receives a longer phase of a gate signal than the other, the motor 28 is set in stepped or pulsed rotation in an unvarying direction, which rotation is sustained until the rectifier balance and motor dither are reestablished.

The particular type rectifiers 248 and 250 chosen can be silicon controlled rectifiers if desired, the specific behavior of which is described in the SCR Manual, Second Edition, pages 55–59, published by General Electric Company.

In FIGURE 10, the small increment sensor 62 or second reference head comprises an upper input coil 254, and a pair of output coils 256 and 258 which are mounted in a lower position in symmetrical relation to the input coil. The flux of the input coil 254, which is an alternating flux, interlinks with the output coils which are coplanar at one end with the coil 254. The outputs of the two coils 256 and 258 are balanced or not depending upon whether or not the nearest confronting locator finger 64 on the panel 214 is midway between the output coils. The output of the two output coils is supplied to a balanced amplifier, not shown, in a manner to unbalance it when the adjacent finger 64 is not midway between the coils. By means of connections, not shown, the take over circuit referred to causes the amplifier when unbalanced to drive the table until the selected locator finger 64 is exactly midway between the output coils 256 and 258 on the second reference head.

Details of the output coils, the resulting differential transformer principle involved, and the connection of a cooperating unbalanced amplifier in the output thereof are described in my U.S. Patent No. 3,039,033, the description of which is incorporated herein by reference.

The fingers 64 are ferromagnetic metal partially severed by means of slots 260 in their connection to the main panel 124. These fingers 64 therefore constitute flat pins adjustable by bending in the plane of the panel 124 so as uniformly to bring their center to center distance to an exact distance apart, for example, one inch center to center as seen at C. Accuracy is therefore insured when the take over circuit, previously referred to in connection with the in position unit 80, not shown, operates the motor to bring the selected finger squarely into transverse alignment with the small increment sensor 62. At that point the motor is stopped, the table being precisely in final position along the axis in question and without the necessity of precision counting and precision built leadscrews and rotary indexing mechanism.

In operation of the device of the preceding figures, a part such as the workpiece 166 of FIGURE 7 is located by clamps or in a fixture on the table 20. Depending upon the basis of the coordinates in the coded perforation input and the size of the workpiece compared to the table, a zero offset adjustment as necessary is made in the rheostat 168, FIGURE 8, to provide the proper amount of X axis zero offset. Similar adjustments are made with respect to the Y and Z axes.

The programmer 60, FIGURE 1, causes the tape reader 54 to adavnce to a pre-recorded block of coded perforations and, in response to the reading called for, to operate the two or more decimal gage assemblies 40 and 44. The first and second reference heads of each assembly are thus set, with the appropriate pick off brush 112 arranged to cooperate as the inch sensor and the small increment sensor 62 arranged to dictate the decimal portion of the final position. The serial method of positioning of the table proceeds, the tape reader 54 meantime having operated the appropriate binary switches 208, FIGURE 8, to establish the zero voltage position desired on the linear potentiometer 150. The table 20 moves along the orthogonal axes simultaneously until the selected small segment 152 is in contact with the pick off brush 112, indicating that the table is within 0.4 inch of its final position. At this point the take over circuit transfers control to the small increment sensor 62.

The first step in the serial method results from a slew signal and at slew speeds, whereas alignment between the sensor 62 and the selected finger 64 transpires at a slower speed characterized by an unbroken chain of intermittent starts and stops of the table. However, the final distance to be moved is at most 0.4 inch and the distance is negotiated practically instantaneously. The master in position unit 90, FIGURE 2, returns a signal to the programmer when the table is in position along all axes, whereupon the programmer actuates all tools such as the drill 26 to perform an operation at the selected point or points on the workpiece.

Meantime, the programmer is causing the tape reader to advance to the next block for a new reading. The programmer then causes the tape reader 54 to operate the decimal gage assemblies and binary switch, resistor increment devices into a new setting, and the cycle is repeated upon completion of the operation in progress on the workpiece.

From the foregoing, it is apparent that my invention provides a highly reliable and economical positioning system. In terms of certain of its chief components, the system comprises supported apparatus including the stop-controlled drive means 28 provided for driving a table member, the stop means 60, 62 actuated by the rail structure or shroud part 38 connected to the member to stop the latter, the part 38 comprising electrical elements a series of which is spaced apart and a selected element 152 of which is electrically sensed by the stop means to stop the member, records 54 with pre-recorded blocks of instructions which are provided representing an orthogonal coordinate figure corresponding to a desired final position of the member, and means 208, 40 provided for selecting the selected element and adjusting the stop means in accordance with the respective integer and decimal portions of the figure.

What is claimed is:

1. For use with a support and a table member thereon driven with programmed movement relative thereto:

apparatus on said support including stop-controlled drive means for driving the member;

stop means actuated by a part connected to the member to discontinue the drive and halt the member when it reaches a desired final position along the direction of movement, said part comprising at least one series of spaced apart elements, a selected one of which carries a voltage null which is sensed by the stop means which acts to discontinue the drive;

the stop means itself being limitedly positionable in the direction of movement; and programming means characterized by:
  records with pre-recorded blocks of instructions representing an orthogonal coordinate figure corresponding to the desired final position of the member; and
  record sensing means effective to select the one element and to adjust the position of the stop means in accordance with the respective integer and decimal portions of the figure.

2. The invention of claim 1, characterized by:
the series of spaced apart elements on said part including a machine-element position-responsive potentiometer establishing cooperation with a relatively fixed reference contactor element therefor;
current source means in circuit with the potentiometer for flowing current from end to end thereof to establish a voltage gradient which includes a zero voltage; and
an impedance creating circuit connecting one end of the potentiometer through impedance to a zero potential ground, the voltage level of the potentiometer shifting in dependence upon the magnitude of impedance present in said circuit and establishing the zero voltage at a desired point along the potentiometer at which the potentiometer is to be in contact with the reference contactor element.

3. For use with a support and a table member thereon driven with programmed movement relative thereto:
  apparatus on said support including stop-controlled drive means for driving the member;
  stop means actuated by a part connected to the member to discontinue the drive and halt the member when it reaches a desired final position along the direction of movement, said part comprising at least one series of spaced apart elements, a selected one of which is sensed by the stop means which acts to discontinue the drive;
  the stop means itself being limitedly positionable in the direction of movement; and
  programming means characterized by:
    records with pre-recorded blocks of instructions representing an orthogonal coordinate figure corresponding to the desired final position of the member;
    sensing means to separately sense the integer and decimal portions of each coordinate figure;
    those elements of the series extending in a first direction, from the particular element selected, having a different operating characteristic imparted thereto in response to the sensing means than imparted to other elements extending in another direction, the particular element selected by the sensing means being at a point in the series corresponding to the integer portion of the coordinate figure;
    first control means establishing cooperation with the spaced apart elements for operating the drive always in a direction whereby the relative movement of the stop means to the part is automatically away from the other elements and toward the selected element; and
    second control means responsive to the sensing means for positioning the stop means in accordance with the decimal portion of the coordinate figure.

4. The invention of claim 3, characterized by:
said elements, responsive to the sensing means, having impressed values of voltage of one polarity in ascending order in said first direction and having impressed values of voltage of the opposite polarity in ascending order in said other direction, the particular element selected in response to the sensing means having null voltage as its selected potential.

5. The invention of claim 4, characterized by:
said part having the one series and also having another series of the spaced apart elements, each having center to center spacing of its elements in exact whole units enabling the selected element of each to be at a point in its series precisely corresponding with the integer portion of the coordinate figure;
the drive means affording a drive under slew speed control and a slower drive under stepping speed control;
said first control means and stop means mutually electrically controlling the drive means under said slew speed control and responsive to a null signal from the selected element of the one series to discontinue the slew speed drive, and mutually electrically controlling the drive means under said stepping speed control and responsive to a null signal arising at the selected element of the other series to discontinue the drive and halt the member in final position as described.

References Cited
UNITED STATES PATENTS

| | | | |
|---|---|---|---|
| 2,897,426 | 7/1959 | Hotine | 318—28 |
| 3,297,925 | 1/1967 | Masel | 318—28 |
| 3,307,083 | 2/1967 | Pegard | 318—467 XR |
| 3,345,556 | 10/1967 | Schmeling et al. | 318—18 XR |
| 3,345,555 | 10/1967 | Machery | 318—18 XR |
| 3,384,797 | 5/1968 | Benton | 318—18 |

BENJAMIN DOBECK, Primary Examiner

U.S. Cl. X.R.
318—24, 28

PO-1050
(5/69)

UNITED STATES PATENT OFFICE
CERTIFICATE OF CORRECTION

Patent No. 3,467,900           Dated September 16, 1969

Inventor(s) Robert C. Benton

It is certified that error appears in the above-identified patent and that said Letters Patent are hereby corrected as shown below:

```
Column 2, line 33, change "to" to --of--.
Column 6, line  8, change "subtraction" to --subtracted--;
          line 55, change "194" to --195--.
Column 8, line 18, after "not" insert --to--;
          line 24, change "194" to --195--;
          line 66, change "264" to --246--.
Column 9, line 44, change "214" to --124--.
```

SIGNED AND
SEALED
MAY 26 1970

(SEAL)
Attest:

Edward M. Fletcher, Jr.
Attesting Officer

WILLIAM E. SCHUYLER, JR.
Commissioner of Patents